United States Patent
Matsuzaki et al.

(10) Patent No.: US 10,404,119 B2
(45) Date of Patent: Sep. 3, 2019

(54) TERMINAL BLOCK OF ROTATING ELECTRIC MACHINE

(71) Applicant: NISSAN MOTOR CO., LTD., Yokohama-shi, Kanagawa (JP)

(72) Inventors: Hirokazu Matsuzaki, Kanagawa (JP); Masahide Kimura, Kanagawa (JP); Toshiaki Tanno, Kanagawa (JP); Hiroshi Nakahara, Kanagawa (JP)

(73) Assignee: NISSAN MOTOR CO., LTD., Yokohama-shi (JP)

(*) Notice: Subject to any disclaimer, the term of this patent is extended or adjusted under 35 U.S.C. 154(b) by 0 days.

(21) Appl. No.: 15/754,411

(22) PCT Filed: Aug. 26, 2015

(86) PCT No.: PCT/JP2015/073936
§ 371 (c)(1),
(2) Date: Feb. 22, 2018

(87) PCT Pub. No.: WO2017/033298
PCT Pub. Date: Mar. 2, 2017

(65) Prior Publication Data
US 2018/0254678 A1    Sep. 6, 2018

(51) Int. Cl.
*H02K 3/04* (2006.01)
*H01R 9/00* (2006.01)
*H02K 5/22* (2006.01)

(52) U.S. Cl.
CPC ............... *H02K 3/04* (2013.01); *H01R 9/00* (2013.01); *H02K 5/22* (2013.01); *H02K 5/225* (2013.01)

(58) Field of Classification Search
CPC .......................... H02K 5/225; H02K 3/522
See application file for complete search history.

(56) References Cited

U.S. PATENT DOCUMENTS

| | | | |
|---|---|---|---|
| 6,600,244 B2* | 7/2003 | Okazaki | H02K 3/522 310/71 |
| 7,262,529 B2* | 8/2007 | Klappenbach | H02K 3/522 310/71 |
| 7,557,478 B2* | 7/2009 | Hoshika | H02K 3/522 310/180 |
| 8,729,755 B2 | 5/2014 | Nakagawa et al. | |
| 9,136,739 B2 | 9/2015 | Yamada et al. | |
| 2009/0039720 A1 | 2/2009 | Tsukashima et al. | |
| 2009/0127948 A1 | 5/2009 | Shimizu et al. | |
| 2009/0230792 A1 | 9/2009 | Goetze et al. | |
| 2012/0068563 A1 | 3/2012 | Avula et al. | |

(Continued)

FOREIGN PATENT DOCUMENTS

| | | |
|---|---|---|
| CN | 102570678 A | 7/2012 |
| CN | 103947088 A | 7/2014 |

(Continued)

*Primary Examiner* — Dang D Le
(74) *Attorney, Agent, or Firm* — Foley & Lardner LLP

(57) ABSTRACT

A terminal block of a rotating electric machine includes a terminal block main body, a high-current electrical wire connecting section to which a high-current electrical wire of the rotating electric machine is connected, multiple neutral wire connecting sections to which neutral wires of the rotating electric machine are connected, and a bus bar that connects the neutral wire connecting sections to each other.

4 Claims, 7 Drawing Sheets

(56) References Cited

U.S. PATENT DOCUMENTS

2012/0126646 A1    5/2012  Nakagawa et al.
2014/0319939 A1  10/2014  Yamada et al.

FOREIGN PATENT DOCUMENTS

| DE | 10 2011 108 581 A1 | 3/2012 |
|----|---|---|
| EP | 2 609 674 B1 | 7/2013 |
| JP | 60-14651 U | 1/1985 |
| JP | 2008-125170 A | 5/2008 |
| JP | 2009-118602 A | 5/2009 |
| JP | 2009-124902 A | 6/2009 |
| JP | 2014-050238 A | 3/2014 |

\* cited by examiner

TERMINAL BLOCK OF ROTATING ELECTRIC MACHINE

TECHNICAL FIELD

The present invention relates to a terminal block of a rotating electric machine.

BACKGROUND ART

Rotating electric machines used as motors, generators, and the like have been conventionally known (refer to, for example, Patent Literature 1).

In some configurations for a rotating electric machine having multiple parallel circuits of star connection (Y connection), neutral points of the circuits are connected to each other. In that case, the electric potentials of the neutral points are made uniform among the circuits, which creates an effect that the magnetic fluxes are made uniform among the circuit.

In a rotating electric machine described in Patent Literature 1, a bus bar formed in a circular arc shape is used to connect neutral points of the circuits to each other. The bus bar has connecting sections for lead wires on the neutral point side of the rotating electric machine, and is arranged at a coil end portion of the rotating electric machine.

CITATION LIST

Patent Literature

Patent Literature 1: Japanese Patent Application Publication No. 2009-124902

SUMMARY OF INVENTION

Technical Problem

In the rotating electric machine described in Patent Literature 1, since the bus bar is arranged at a coil end portion of the rotating electric machine, there is a problem that holding the bus bar is likely to be unstable.

In view of the above, an object of the present invention is to provide a terminal block of a rotating electric machine that can improve the stability of holding a bus bar connecting the neutral points of the circuits to each other.

Solution to Problem

A terminal block of a rotating electric machine according to the present invention includes a plurality of neutral wire connecting sections to which neutral wires of the rotating electric machine are connected and a bus bar that connects the neutral wire connecting sections to each other.

Advantageous Effects of Invention

The terminal block of a rotating electric machine according to the present invention can improve the stability of holding the bus bar.

DESCRIPTION OF EMBODIMENTS

Hereinafter, embodiments of the present invention will be described in detail along with the drawings.

First Embodiment

A terminal block according to the first embodiment of the present invention will be described based on FIGS. 1 to 5.

A rotating electric machine 1 is used for a rotating electric machine, such as a motor and a generator. The rotating electric machine 1 is, for example, a motor having three phase poles.

Figure 1:
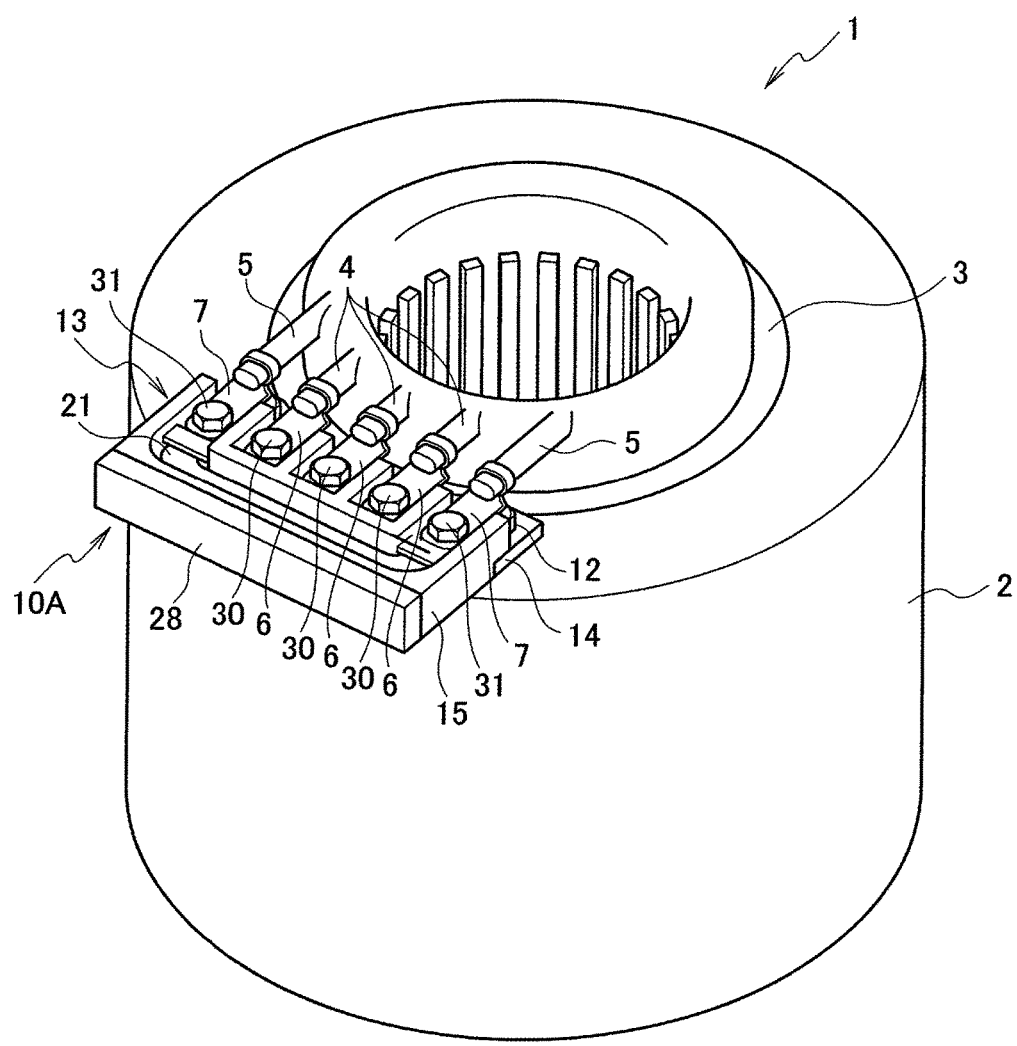
FIG. 1 is a perspective view of a rotating electric machine having a terminal block according to a first embodiment of the present invention.
Figure 2:
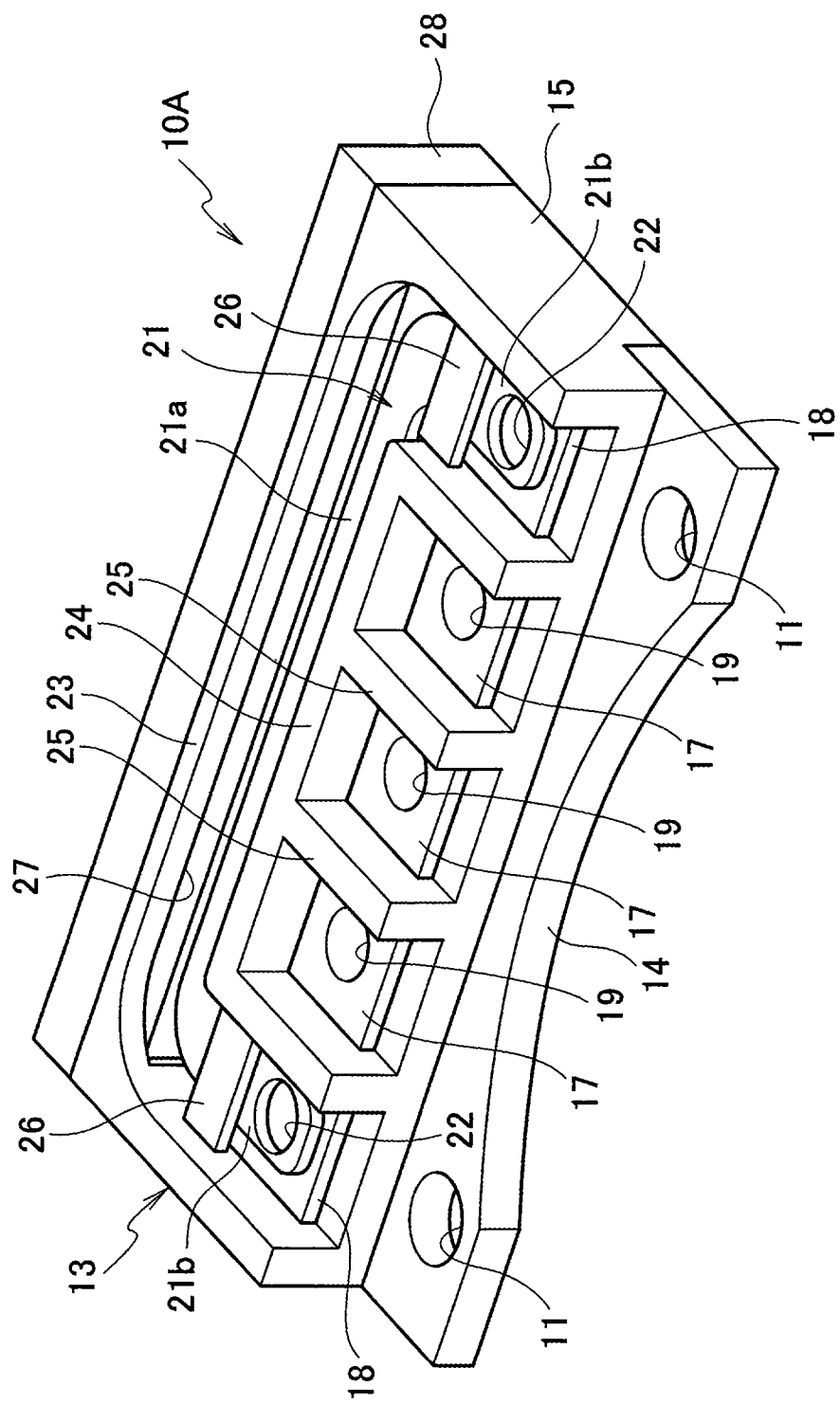
FIG. 2 is a perspective view of the terminal block according to the first embodiment of the present invention.
Figure 3:
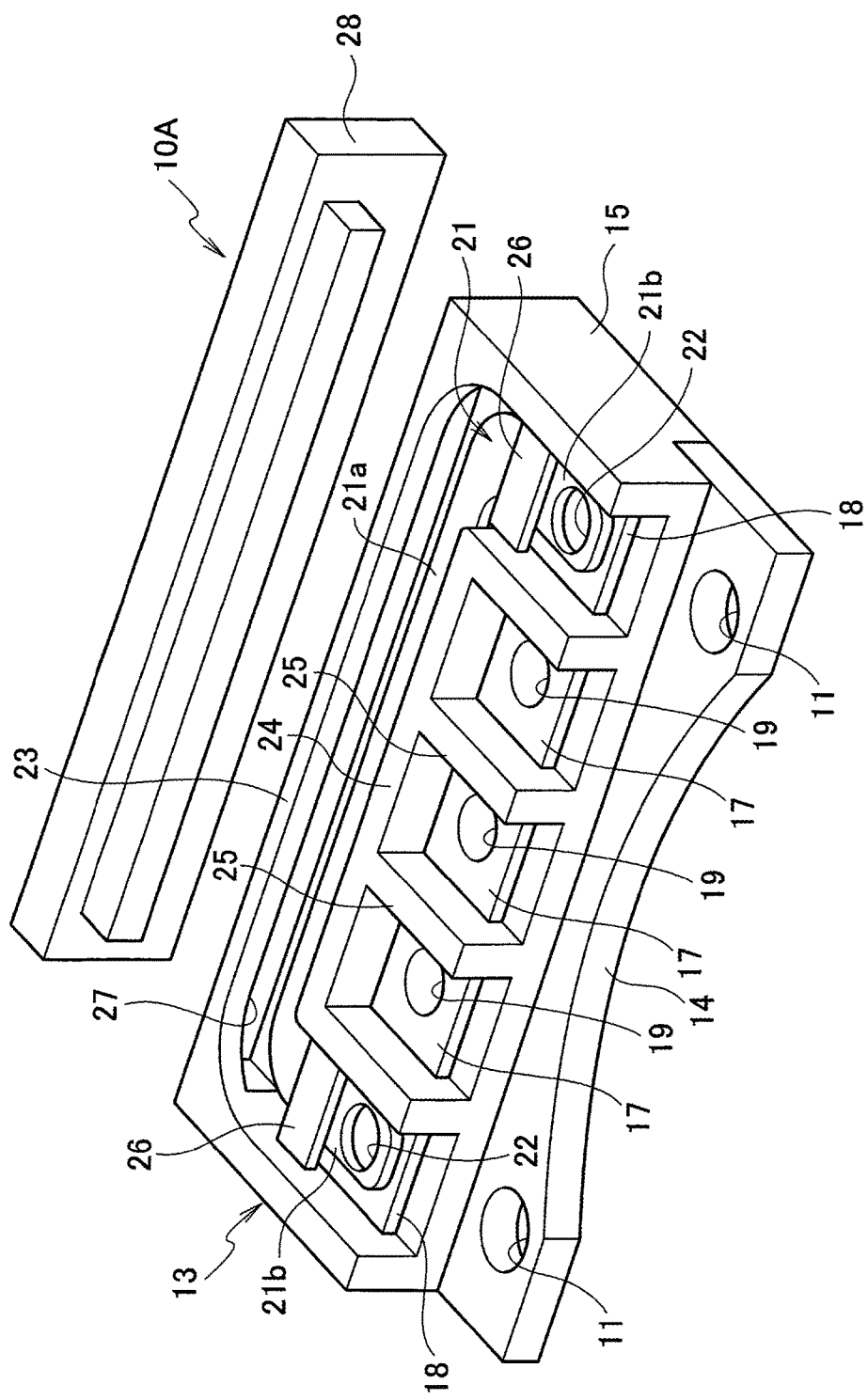
FIG. 3 is an exploded perspective view of the terminal block according to the first embodiment of the present invention.

As illustrated in FIG. 1, the rotating electric machine 1 includes a housing 2, a stator 3 housed in the housing 2, and a rotor (not illustrated) provided inside the stator 3. The stator 3 is formed in a cylindrical shape, and coils of multiple phases including the U-phase, V-phase, and W-phase are wound in slots formed on the inner circumferential side of the stator 3 at equal angular intervals. The stator 3 has multiple (in this embodiment, three) high-current electrical wires (lead wires) 4 extending respectively from the coils of the phases. In addition to the high-current electrical wires 4 of the U-phase, V-phase, and W-phase, multiple (in this embodiment, two) neutral wires (lead wires) 5 of the neutral phase, which is equivalent to ground, also extend to an end surface of the stator 3. To the distal end of each the high-current electrical wires 4 of the U-phase, V-phase, and W-phase is attached a terminal 6. To the distal end of each of the neutral wires 5 of the neutral phase is attached a terminal 7.

The rotating electric machine 1 includes a terminal block (bus bar built-in terminal block) 10A attached at an end surface of the housing 2. The terminal block 10A is attached to the housing 2 using bolts 12 passing through through holes 11 (refer to FIGS. 2 to 4).

As illustrated in FIGS. 2 to 5, a terminal block main body 13 of the terminal block 10A is made by assembling a resin cover 15 to a metal base 14. To prevent the base 14 from directly touching the cover 15, an insulating plate 16 made of a highly heat conductive resin is provided between the base 14 and the cover 15. The base 14 is made, for example, of aluminum, and the cover 15 is made, for example, of PPS resin. The insulating plate 16 is made of a resin material different from one which the cover 15 is made of, and this different resin material has an electrical insulating property as well as higher thermal conductivity than the resin material which the cover 15 is made of.

On the terminal block main body 13 are provided in a three high-current electrical wire connecting sections 17 of the U-phase, V-phase, and W-phase to which the terminals 6 of the high-current electrical wires 4 of the U-phase, V-phase, and W-phase are electrically connected, as well as two neutral wire connecting sections 18 of the neutral phase to which the terminals 7 of the neutral wires 5 of the neutral phase are electrically connected. Specifically, the three high-current electrical wire connecting sections 17 are provided at the center of the terminal block main body 13, and the two neutral wire connecting sections 18 are provided at the both ends of the terminal block main body 13 with the three high-current electrical wire connecting sections 17 interposed in between. Formed at the high-current electrical wire connecting sections 17 and the neutral wire connecting sections 18 are bolt holes 19 and 20, respectively. The high-current electrical wire connecting sections 17 and the neutral wire connecting sections 18 are made of conductive materials. The joining method between the high-current electrical wire connecting section 17 and the cover 15 may be insert molding or press fitting. Similarly, the joining method between the neutral wire connecting section 18 and the cover 15 may be insert molding or press fitting.

In the terminal block main body 13 is provided a bus bar 21 that electrically connects the two neutral wire connecting sections 18 to each other. The bus bar 21 has a first conductive portion 21a extending linearly and second conductive portions 21b extending perpendicularly from the both ends of the first conductive portion 21a, and is formed in a U shape in plan view. The shape of the bus bar 21 only needs to be one not interfering with the high-current electrical wire connecting sections 17 and the neutral wire connecting sections 18, and is not limited to a U shape in plan view. At the distal ends of the second conductive portions 21b of the bus bar 21 are formed through holes 22. The bus bar 21 is made, for example, of copper.

In addition, the terminal block main body 13 has a frame 23 defining a space in which the bus bar 21, the high-current electrical wire connecting sections 17, and the neutral wire connecting sections 18 are provided, a partition wall 24 provided between the high-current electrical wire connecting sections 17 and the bus bar 21, and partition walls 25 provided between adjacent high-current electrical wire connecting sections 17. The frame 23 and the partition wall 24 are formed in a U shape in plan view. The frame 23 and the partition walls 24 and 25 are integrally formed with the cover 15 of the terminal block main body 13. In other words, the frame 23 and the partition walls 24 and 25 are made of a material having an electrical insulating property.

In addition, the terminal block main body 13 has fixing portions 26 for fixing the bus bar 21, and the terminal block main body 13 has a slit 27 formed for inserting the bus bar 21. The fixing portion 26 is provided to bridge between the frame 23 and the partition wall 24. By inserting the second conductive portion 21b of the bus bar 21 between the fixing portion 26 and the cover 15 of the terminal block main body 13, the bus bar 21 is fixed to the terminal block main body 13.

Figure 4:
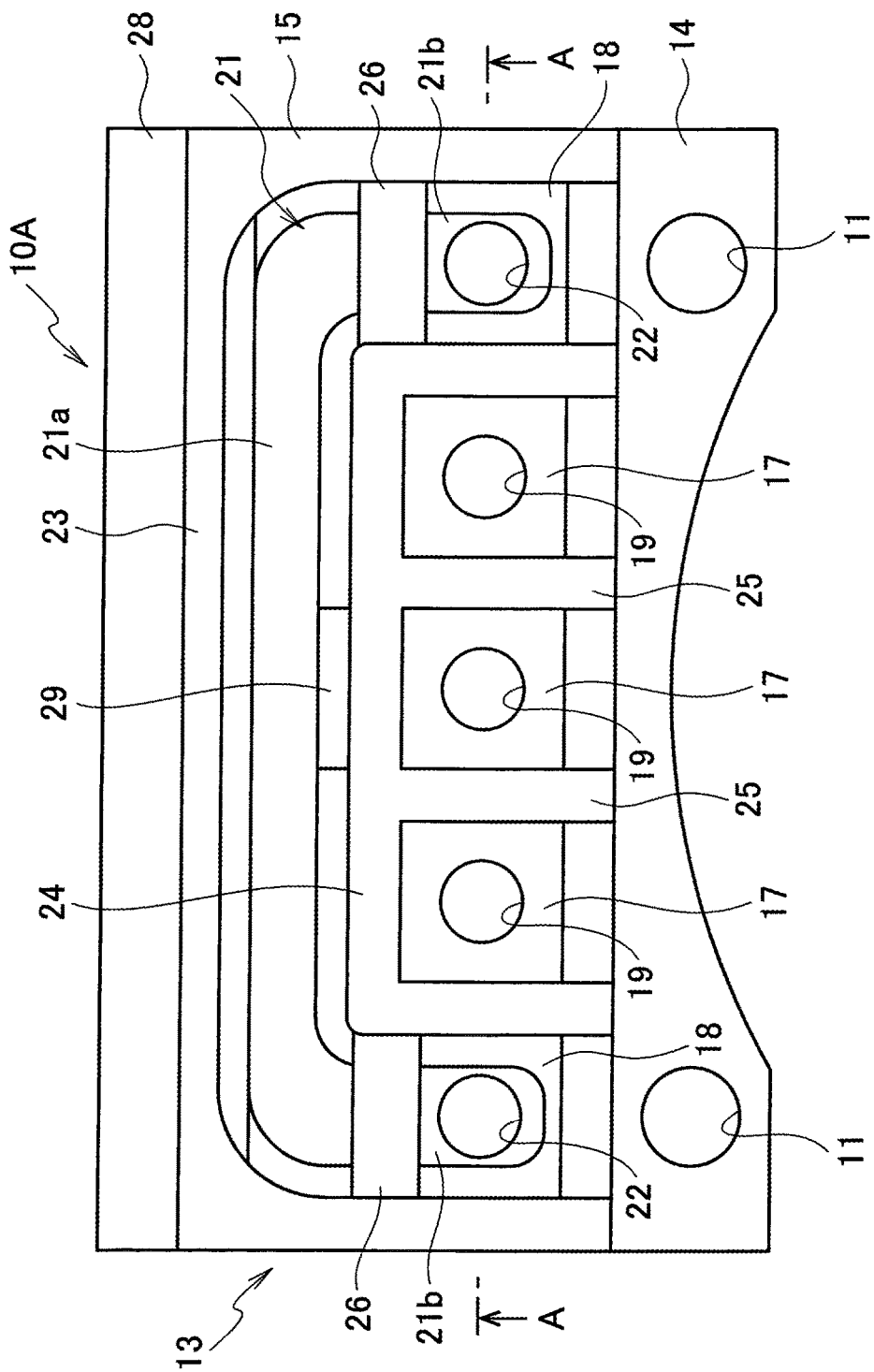
FIG. 4 is a plan view of the terminal block according to the first embodiment of the present invention.
Figure 5:
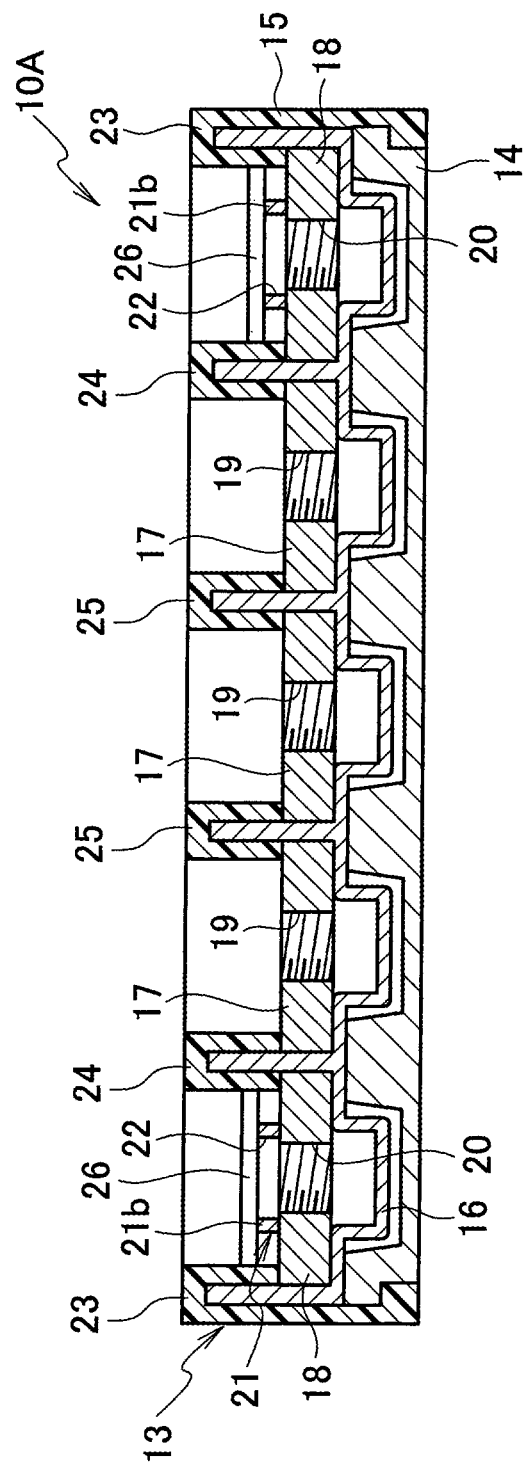
FIG. 5 is a cross-sectional view taken along line A-A in FIG. 4.

Moreover, the terminal block main body 13 has a lid member 28 made of resin to close the slit 27. The lid member 28 is made, for example, of the same resin material as that of the cover 15. The lid member 28 is attached to the terminal block main body 13 with the second conductive portions 21b of the bus bar 21 inserted between the fixing portions 26 and the cover 15 of the terminal block main body 13. By doing so, the bus bar 21 is positioned, as illustrated in FIG. 4, between the lid member 28 and a protrusion 29 integrally formed with the cover 15.

When assembling the rotating electric machine 1, bolts 30 are screwed into the bolt holes 19 of the high-current electrical wire connecting sections 17 to fasten the terminals 6 of the high-current electrical wires 4 and a bus bar (not illustrated) for an inverter together to the high-current electrical wire connecting sections 17. Meanwhile, bolts 31 are screwed into the bolt holes 20 of the neutral wire connecting sections 18 to fasten the terminals 7 of the neutral wires 5 and the bus bar 21 together. By doing so, the high-current electrical wires 4 of the rotating electric machine 1 are electrically connected to the high-current electrical wire connecting sections 17, and the neutral wires 5 of the rotating electric machine 1 are electrically connected to the neutral wire connecting sections 18.

Hereinafter, operation and effects of this embodiment will be described.

(1) The terminal block 10A according to this embodiment includes the terminal block main body 13, the high-current electrical wire connecting sections 17 to which the high-current electrical wires 4 of the rotating electric machine 1 are connected, the multiple neutral wire connecting sections 18 to which the neutral wires 5 of the rotating electric machine 1 are connected, and the bus bar 21 connecting the multiple neutral wire connecting sections 18 to each other.

The terminal block 10A according to this embodiment has a structure in which the bus bar 21 is built-in, and is fixed to the housing 2 of the rotating electric machine 1. Since the housing 2 itself to which the terminal block 10A is attached is rigid to a certain extent, the terminal block 10A is firmly fixed to the housing 2. In addition, since the terminal block 10A itself to which the bus bar 21 is attached also is rigid to a certain extent, the bus bar 21 is firmly fixed to the terminal block 10A. Consequently, the stability of holding the bus bar 21 is improved, and it is possible to use the rotating electric machine 1 in a field where large vibrations and large impact inputs are applied, such as mobile equipment.

Thus, the terminal block 10A of the rotating electric machine 1 according to this embodiment improves the stability of holding the bus bar 21.

(2) The terminal block main body 13 has the partition wall 24 provided between the high-current electrical wire connecting sections 17 and the bus bar 21, and the partition wall 24 is made of an electrically insulating material.

Since the partition wall 24 between the high-current electrical wire connecting sections 17 and the bus bar 21 provides electrical insulation between the high-current electrical wire connecting sections 17 and the bus bar 21, it is possible to shorten the distance between the high-current electrical wire connecting sections 17 and the bus bar 21, which makes it possible to downsize the terminal block 10A.

(3) The terminal block main body 13 has the fixing portions 26 for fixing the bus bar 21, and the terminal block main body 13 is provided with the slit 27 formed for inserting the bus bar 21.

Since the bus bar 21 is not disengaged from the terminal block main body 13 even before the neutral wires 5 are connected to the neutral wire connecting sections 18, the ease of assembling the terminal block 10A to the rotating electric machine 1 is improved. In addition, since the slit 27 for inserting the bus bar is formed in the terminal block main body 13, it is easy to fix the bus bar 21 to the fixing portion 26.

(4) The terminal block main body 13 has the lid member 28 to close the slit 27.

The lid member 28, which closes the slit 27, provides electrical insulation between parts outside the lid member 28 and the bus bar 21, also holds the bus bar 21 in the terminal block main body 13.

Second Embodiment

A terminal block according to a second embodiment of the present invention will be described based on FIG. 6.

Note that the same parts as in the above first embodiment are denoted by the same reference signs, and thus, descriptions thereof will be omitted.

Figure 6:
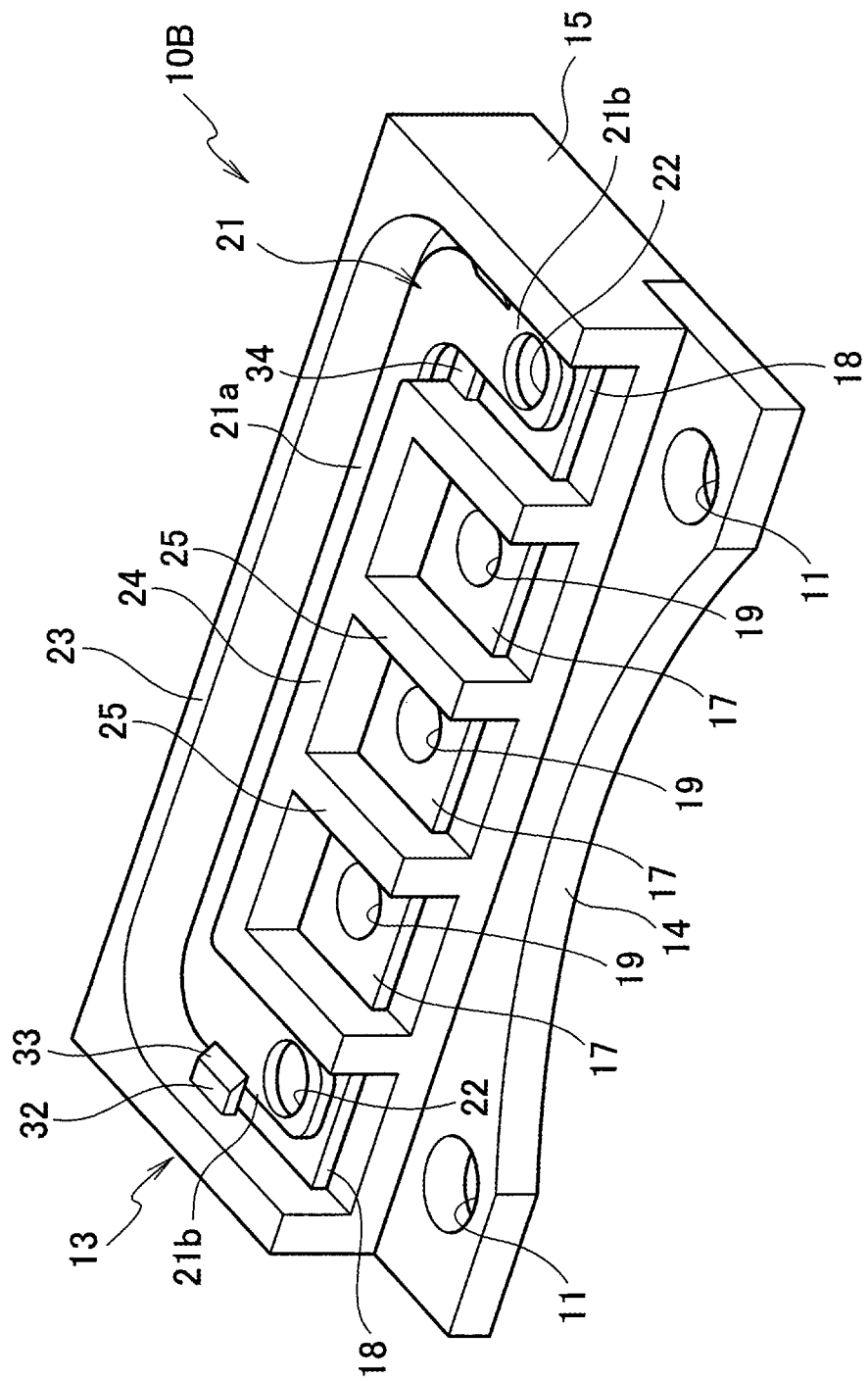
FIG. 6 is a perspective view of a terminal block according to a second embodiment of the present invention.

As illustrated in FIG. 6, a terminal block main body 13 of a terminal block 10B has fixing tabs 32 for fixing a bus bar 21. Formed at the outer surface of the fixing tab 32 is an inclined portion 33. When the bus bar 21 is attached from the outside of the terminal block main body 13 by pressing the bus bar 21 to the fixing tabs 32, the inclined portions 33 of the fixing tabs 32 guide second conductive portions 21b of the bus bar 21 to fit into the fixing tabs 32, which makes the attachment easy. By attaching the bus bar 21 such that the bus bar 21 fits into the fixing tabs 32, the bus bar 21 is positioned by protrusions 34 integrally formed with a cover 15 as illustrated in FIG. 6.

Hereinafter, operation and effects of the second embodiment will be described.

In the terminal block 10B according to the second embodiment, the terminal block main body 13 has the fixing tabs 32 for fixing the bus bar 21.

Since the bus bar 21 is not disengaged from the terminal block main body 13 even before neutral wires 5 are connected to neutral wire connecting sections 18, the ease of assembling the terminal block 10B to the rotating electric machine 1 is improved. In addition, when the bus bar 21 is pressed against the fixing tabs 32, the fixing tabs 32 are elastically deformed and the bus bar 21 fits in. Thus it is easy to fix the bus bar 21 to the fixing tabs 32.

Although the present invention has been described as above in accordance with the embodiments, the present invention is not limited to these descriptions. It is apparent to those skilled in the art that various modifications and improvements can be made.

Figure 7:
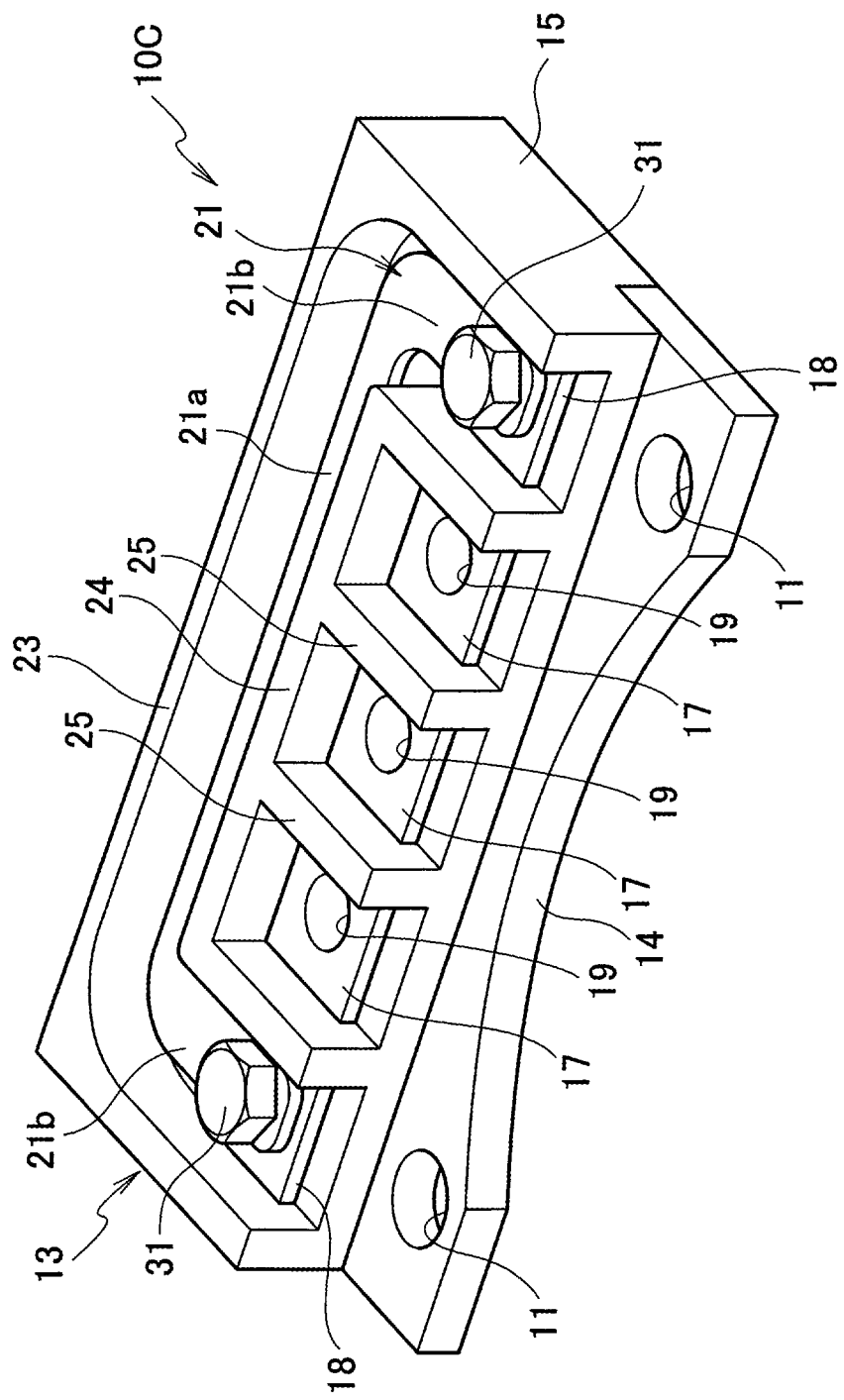
FIG. 7 is a perspective view of a terminal block according to a modification of the present invention.

For example, the fixing portions 26 and the fixing tabs 32 may be eliminated as illustrated in FIG. 7. In that case, the bus bar 21 may be temporally fastened (fixed) to the neutral wire connecting sections 18 using the bolts 31 during parts transportation or the like. Alternatively, although not illustrated, in the case where the distance between the high-current electrical wire connecting sections 17 and the bus bar 21 are large enough, or in similar cases, the partition walls 24 and 25 can be eliminated.

REFERENCE SIGNS LIST 1 rotating electric machine
4 high-current electrical wire
5 neutral wire
10 terminal block
13 terminal block main body
17 high-current electrical wire connecting section
18 neutral wire connecting section
21 bus bar
24 partition wall
26 fixing portion
27 slit
28 lid member
32 fixing tab

The invention claimed is:

1. A terminal block connecting with a plurality of neutral wires and a plurality of high-current electrical wires extended from coils of a rotating electric machine, the terminal block comprising:
   a terminal block main body;
   a plurality of high-current electrical wire connecting sections which are provided in the terminal block main body and to which a terminal of the plurality of high-current electrical wires extended from the coils of the rotating electric machine is respectively connected;
   a plurality of neutral wire connecting sections which are provided in the terminal block main body and to which a terminal of the plurality of neutral wires is respectively connected; and
   a bus bar which is fixed to the terminal block main body and connects the plurality of neutral wire connecting sections to each other, wherein
   the terminal block main body has a partition wall provided between a high-current electrical wire connecting section and the bus bar, and
   the partition wall is made of a material having an electrical insulating property.

2. The terminal block of the rotating electric machine according to claim 1, wherein
   the terminal block main body has a fixing portion for fixing the bus bar, and
   in the terminal block main body, a slit is formed for inserting the bus bar.

3. The terminal block according to claim 2, wherein
   the terminal block main body has a lid member to close the slit.

4. The terminal block according to claim 1, wherein
   the terminal block main body has a fixing tab for fixing the bus bar.

* * * * *